United States Patent
Accardo et al.

(10) Patent No.: US 10,817,583 B2
(45) Date of Patent: Oct. 27, 2020

(54) SYSTEMS AND METHODS FOR NON-LINEAR CONTENT CREATION

(71) Applicant: Disney Enterprises, Inc., Burbank, CA (US)

(72) Inventors: Anthony Accardo, Glendale, CA (US); Mark Arana, Burbank, CA (US); Markus Gross, Zürich (CH); Chris Thomes, Encino, CA (US)

(73) Assignee: Disney Enterprises, Inc., Burbank, CA (US)

( * ) Notice: Subject to any disclaimer, the term of this patent is extended or adjusted under 35 U.S.C. 154(b) by 700 days.

(21) Appl. No.: 14/628,094

(22) Filed: Feb. 20, 2015

(65) Prior Publication Data
US 2016/0246891 A1 Aug. 25, 2016

(51) Int. Cl.
| | | |
|---|---|---|
| G06F 16/955 | (2019.01) | |
| G06F 16/28 | (2019.01) | |
| G06F 16/958 | (2019.01) | |
| G06F 16/23 | (2019.01) | |

(52) U.S. Cl.
CPC ........ G06F 16/955 (2019.01); G06F 16/2365 (2019.01); G06F 16/284 (2019.01); G06F 16/958 (2019.01)

(58) Field of Classification Search
CPC .... G06F 16/955; G06F 16/958; G06F 16/284; G06F 16/2365
USPC ........................................................ 707/690
See application file for complete search history.

(56) References Cited

U.S. PATENT DOCUMENTS

| | | | | |
|---|---|---|---|---|
| 6,161,115 A | * | 12/2000 | Ohanian | G11B 27/034 715/203 |
| 7,246,315 B1 | * | 7/2007 | Andrieu | G06Q 90/00 715/706 |
| 7,930,418 B2 | | 4/2011 | Sukendeep | |
| 8,218,764 B1 | | 7/2012 | Kline | |
| 8,341,525 B1 | * | 12/2012 | Achour | G11B 27/34 715/716 |
| 8,566,348 B2 | | 10/2013 | Rinearson | |
| 8,661,096 B2 | * | 2/2014 | Chou | G11B 27/034 709/219 |
| 8,694,896 B2 | | 4/2014 | Edwards | |
| 2006/0064644 A1 | * | 3/2006 | Joo | H04N 21/2743 715/751 |
| 2008/0013915 A1 | * | 1/2008 | Gill | H04N 21/854 386/281 |
| 2008/0276188 A1 | | 12/2008 | Zerger | |

(Continued)

OTHER PUBLICATIONS

Elson, David K., and Mark O. Riedl. "A Lightweight Intelligent Virtual Cinematography System for Machinima Production." AIIDE 2 (2007): 3.*

(Continued)

*Primary Examiner* — Mohsen Almani
(74) *Attorney, Agent, or Firm* — Farjami & Farjami LLP (57) ABSTRACT

A system includes a memory configured to store a plurality of tools and a processor configured to use the plurality of tools. The processor uses the plurality of tools to retrieve historical information relating to a storyline, retrieve user information relating to user interactions with the storyline, provide the historical information and the user information for incorporating into the content, and generate the content using the historical information and the user information.

25 Claims, 5 Drawing Sheets

(56) References Cited

U.S. PATENT DOCUMENTS

| | | | |
|---|---|---|---|
| 2009/0094039 A1 | 4/2009 | MacDonald | |
| 2009/0254836 A1* | 10/2009 | Bajrach | G11B 27/031 715/745 |
| 2011/0113315 A1 | 5/2011 | Narendranath | |
| 2012/0131041 A1 | 5/2012 | Ashland | |
| 2013/0290871 A1 | 10/2013 | Jordan | |
| 2014/0133834 A1 | 5/2014 | Shannon | |
| 2014/0233918 A1* | 8/2014 | Roberts, Jr. | G11B 27/323 386/285 |
| 2014/0282013 A1* | 9/2014 | Amijee | G06F 3/0482 715/732 |
| 2015/0007064 A1* | 1/2015 | Givoni | G06F 16/958 715/760 |
| 2015/0317571 A1* | 11/2015 | Maetz | G09C 5/00 386/278 |
| 2018/0225588 A1* | 8/2018 | Khidekel | G06Q 30/06 |
| 2019/0104339 A1* | 4/2019 | Tsivin | G06Q 10/06393 |

OTHER PUBLICATIONS

Liu, Shixia, et al. "Storyflow: Tracking the evolution of stories." IEEE Transactions on Visualization and Computer Graphics 19.12 (2013): 2436-2445.*

Tapscott, Alan, et al. "Writing Consistent Stories based on Structured Multi-Authored Narrative Spaces." 2013 Workshop on Computational Models of Narrative. Schloss Dagstuhl-Leibniz-Zentrum fuer Informatik, 2013. (Year: 2013).*

Sgouros, Nikitas M., and Stavros Sotirchos. "Determining the visual interpretation of actions in multimedia presentations of interactive stories." Journal of Intelligent and Robotic Systems 26.2 (1999): 187-197. (Year: 1999).*

Gebhard, Patrick, et al. "Authoring scenes for adaptive, interactive performances." Proceedings of the second international joint conference on Autonomous agents and multiagent systems. 2003. (Year: 2003).*

Wongsuphasawat, Krist, and David Gotz. "Exploring flow, factors, and outcomes of temporal event sequences with the outflow visualization." IEEE Transactions on Visualization and Computer Graphics 18.12 (2012): 2659-2668. (Year: 2012).*

Matteo Gaeta, "A methodology and an authoring tool for creating Complex Learning Objects to support interactive storytelling", Aug. 24, 2013, pp. 1-18 http://www.elsevier.com/locate/comphumbeh.

Adriana Ornellas, "Open video tools to support the production of online collaborative audiovisual projects: How to promote collective creation in e-learning", Barcelonal Open Ed 2010, http://openedconference.org/2010/, pp. 1-12.

* cited by examiner

SYSTEMS AND METHODS FOR NON-LINEAR CONTENT CREATION

BACKGROUND

Today's distribution technologies for video experiences enable a new type of storytelling that can both receive inputs from the audience and adjust facets of the story, plot or other parameters of the end-to-end story experience. These inputs can occur via a direct interface into the viewing device or digital player, or these inputs can occur through other technology platforms and devices not directly connected to the primary viewing screen or platform. Additionally, the story itself may be distributed across and span multiple platforms, devices, time horizons, and viewers.

However, very few tools exist to make the writing, preproduction and planning, production, post-production and distribution easier and simpler. Conventionally, each tool for each phase has to be manually generated and manually programmed in order to ensure an accurate logic for the storyline in order to have continuity, which leaves room for mistakes and a lack of continuity.

Today, changes in the story or other facets of the experience currently need to be manually generated and manually programmed. For example, assembling videos in an interactive video, graphically designing mechanisms for user input to be overlaid on top of a video, or maintaining the logic in a non-linear story are some changes that would need to be manually generated and manually programmed. As a result, creation of such experiences is necessarily separated from the writing and production of such experiences, making the artistic unity and vision difficult for a content creator to exert control over.

SUMMARY

The present disclosure is directed to systems and methods for non-linear content creation, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
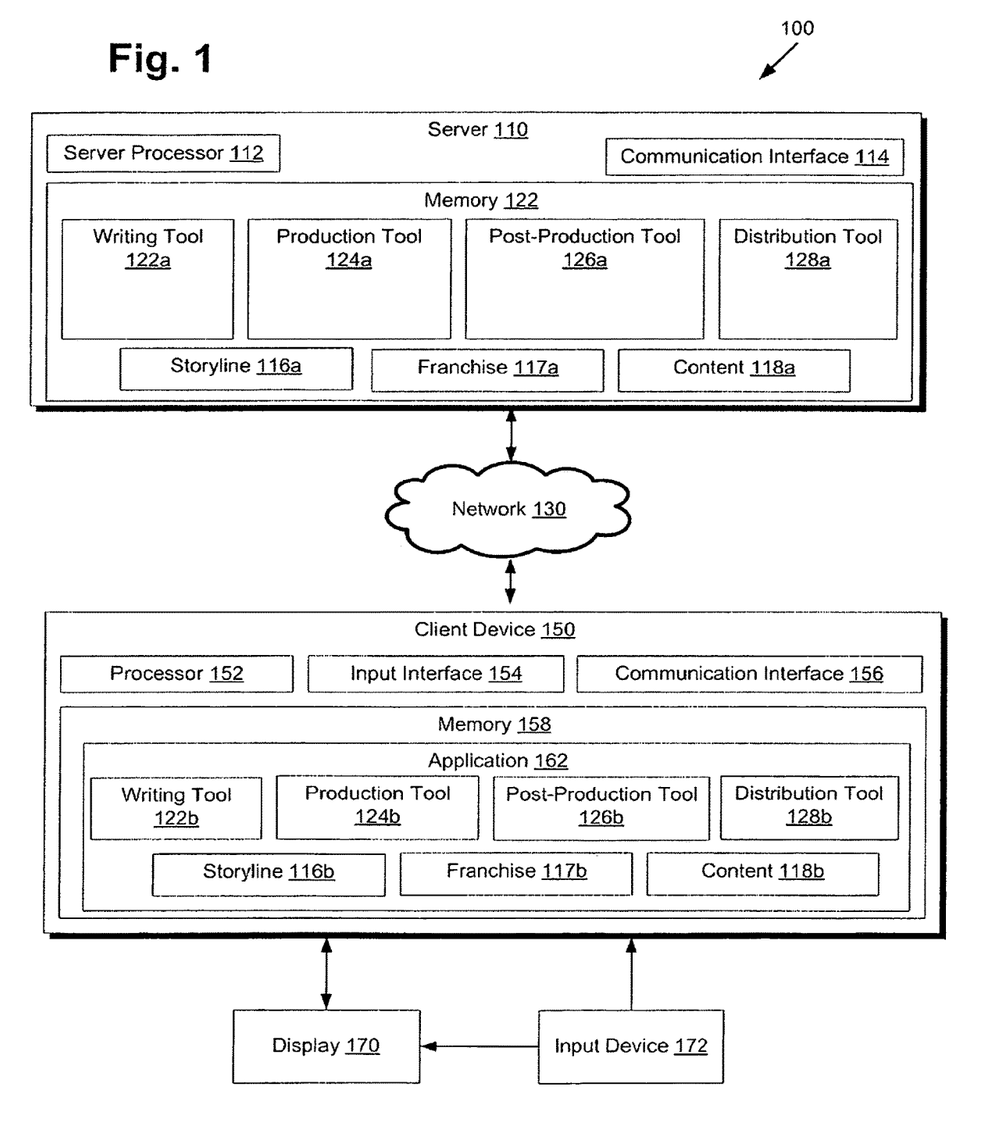
FIG. 1 presents a system for non-linear content creation, according to one implementation of the present disclosure.

FIG. 1 presents a system for non-linear content creation, according to one implementation of the present disclosure. System 100 of FIG. 1 includes server 110, network 130, client device 150, display 170, and input device 172. Server 110 includes server processor 112, communication interface 114, and memory 122. Memory 122 includes writing tool 122a, production tool 124a, post-production tool 126a, distribution tool 128a, storyline 116a, franchise 117a, and content 118a. Client device 150 includes processor 152, input interface 154, communication interface 156, and memory 158. Memory 158 includes application 162 having writing tool 122b, production tool 124b, post-production tool 126b, distribution tool 128b, storyline 116b, franchise 117b, and content 118b.

Server 110 is configured to communicate with client device 150 via network 130 to provide updates and information stored in memory 122 of server 110. In some implementations, server 110 may be configured to dynamically transmit information and data from writing tool 122a, production tool 124a, post-production tool 126a, distribution tool 128a, storyline 116a, franchise 117a, and content 118a to client device 150 for use by client device 150. In other implementations, server 110 may be configured to transmit all of the data and the information at one time, as the data and the information are requested, and/or at certain time intervals.

Server 110 may be operated and be accessible by different departments within a company. For example, within server 110, writing tool 122a may be operated by a writing department, production tool 124a may be operated by a production department, post-production tool 126a may be operated by a post-production department, and distribution tool 128a may be operated by a distribution department of a company. However, in some implementations, there may be any number of servers operated by any number of companies and/or businesses, including different departments within each company/business, where each server, including server 110, communicate data and information to each other server.

In some implementations, server 110 may also be a local server, where network 130 is a local area network (LAN) and all the data and information on server 110 may be transmitted across the local area network to client device 150. In such an implementation, server 110 may be a company server accessible by each department within the company.

Also illustrated in FIG. 1, server 110 includes server processor 112 and memory 122. Server processor 112 may be configured to access memory 122 to store received input or to execute commands, processes, or programs stored in memory 122. Server processor 112 may correspond to a processing device, such as a microprocessor or similar hardware processing device, or a plurality of hardware devices. However, in other implementations server processor 112 refers to a general processor capable of performing the functions required of server 110. Memory 122 is capable of storing commands, processes, and programs for execution by server processor 112. Memory 122 may be instituted as ROM, RAM, flash memory, or any sufficient memory capable of storing a set of commands. In other implementations, memory 122 may correspond to a plurality memory types or modules.

Server 110 may utilize communication interface 114 to communicate with communication interface 156 of client device 150 over network 130. Communication interface 114 can utilize any types of wired and wireless interfaces, as examples, one or more of Ethernet, Wireless Fidelity (Wi-Fi), Worldwide Interoperability for Microwave Access (Wi-Max), ZigBee, Bluetooth, RFID, Algorithm Division Multiple Access (CDMA), Evolution-Data Optimized (EV-DO), Global System for Mobile Communications (GSM), Long Term Evolution (LTE).

Writing tool 122a is configured to store, provide, and utilize data, information, logic, visualization, and planning pertaining to characters, character worlds, locations, vocabularies, objects, actions, events, and other information associated with storyline 116a and franchise 117a in order to aid in the creation of content 118a. Writing tool 122a is further configured to determine the location of and access existing materials across network 130. For example, writing tool 122a may determine the location of information relating to storyline 116a on network 130, or provide the location of the information to the user. The existing information is used by writing tool 122a to further aid in the creation and generation of content 118a.

Production tool 124a is configured to store, provide, and utilize data, information, and logic associated with storyline 116a, franchise 117a, and business models to provide shot planning, cost scaling, musical continuity, and other information relating to production of content 118a. Post-production tool 126a is configured to store, provide, and utilize data, information, and logic associated with storyline 116a and franchise 117a to assemble, edit, design, and develop content 118a.

Distribution tool 128a is configured to store, provide, and utilize data, information, feedback, device information, and analytics associated with storyline 116a, franchise 117a, and viewers of content associated with storyline 116a and franchise 117a to create, manage, and determine client device compatibility, continuity of storyline 116a, and user engagement levels to aid in creation of content 118a.

In some implementations, each of writing tool 122a, production tool 124a, post-production tool 126a, and distribution tool 128a may be implemented as distinct and separate modules and programs, or any number of the tools may be integrated into one. In other implementations, each of writing tool 122a, production tool 124a, post-production tool 126a, and distribution tool 128a may be a plug-in for an already existing program. For example, writing tool 122a may be a plug-in for a script writing program, production tool 124a may be a plug-in for a video creation program, etc.

In some implementations, all the information from each of writing tool 122a, production tool 124a, post-production tool 126a, and distribution tool 128a along with storyline 116a and franchise 117a may be included in a knowledge database for access by server 110 and/or client device 150. For example, all of the information may be input into a spreadsheet that is parsed by server 110 and/or client device 150. In such an example, the spreadsheets are managed and matched such that all of the information is in a standardized language. As such, information from each of writing tool 122a, production tool 124a, post-production tool 126a, and distribution tool 128a can be input into the spreadsheets and understood by server 110 and/or client device 150. In another implementation, the information may be in a visual graph or logic map, such as that presented in diagram 600 of FIG. 6.

In some implementations, each of writing tool 122a, production tool 124a, post-production tool 126a, and distribution tool 128a may communicate with each other throughout the end-to-end process of generating content 118a. In such an implementation, each of writing tool 122a, production tool 124a, post-production tool 126a, and distribution tool 128a may utilize a standardized language understood by each of writing tool 122a, production tool 124a, post-production tool 126a, and distribution tool 128a.

Each of writing tool 122a, production tool 124a, post-production tool 126a, and distribution tool 128a provide information to the user, server 110, and client device 150 for creation of rules that are used in creation of content 118a and/or content 118b. For example, a rule that is created by writing tool 122a, production tool 124a, post-production tool 126a, and/or distribution tool 128a may prohibit and/or provide a warning to the user creating content 118a and/or content 118b such that the user becomes aware of the rule. For example, CHARACTER-1 and CHARACTER-2 may be prohibited from being included in the same storyline, because they lived at different times in history. In such an example, when the user writing the script for content 118a tries to include CHARACTER-1 and CHARACTER-2 in the same scene, the user is provided with a notification that they are breaking the rule by trying to include CHARACTER-1 and CHARACTER-2 in the same scene in storyline 116a.

Storyline 116a is used to guide and provide information for each of writing tool 122a, production tool 124a, post-production tool 126a, and distribution tool 128a. Storyline 116a includes the storyline of content 118a, and may also include the entire storyline throughout a defined history and even into the future, across any number of platforms. For example, storyline 118a may include all past events and storylines associated with a franchise included in franchise 117a, such as FRANCHISE-1 and the future plans for the storyline of FRANCHISE-1, across a number of platforms including, but not limited to, video, television, video games, comics, toys, and any other platform used that is associated with the storyline of FRANCHISE-1. As such, when the storyline is being developed for content 118a, the past, present, and future events and timelines associated with FRANCHISE-1 are gathered to form the storyline for content 118a to ensure continuity of storyline 116a.

For example, analytics captured and processed by distribution tool 128a may indicate that viewers of a movie associated with FRANCHISE-1 would enjoy CHARACTER-1 being a sidekick to CHARACTER-2. However, when a user of client device 150 receives this information and begins to write a script where CHARACTER-1 is a sidekick to CHARACTER-2, writing tool 122a may use logic generated from storyline 116a to notify the user that CHARACTER-1 and CHARACTER-2 cannot be sidekicks, because it would conflict with a past or future event within storyline 116a, for example. As a result, storyline 116a would remain continuous without the user having to personally research and/or seek others to determine their ability to have CHARACTER-1 and CHARACTER-2 be sidekicks.

In another example, while the user is creating content 118a, information may be provided from any of writing tool 122a, production tool 124a, post-production tool 126a, and distribution tool 128a to assist the user in creating content 118a with continuity of storyline 116a. For example, writing tool 122a may provide, based on the ontology and controlled vocabulary, keywords from related classes and authority lists that might prompt a user to include concepts or related story ideas. In addition, distribution tool 128a may recommend scenes, characters, or events to be included in the storyline of content 118a based on user feedback and user interest in similar scenes, characters, or events from other content. Further, if content 118a is a movie or video, for example, production tool 124a may provide the user with information about costs of developing and shooting scenes for a the movie or video based on a script the user is creating based on historical information of similar scenes, in order to help the user create a script that is within the cost budget for content 118a. As such, of the tools within server 110 can provide information for the continuity of storyline 116a while simultaneously increasing user engagement and managing costs.

Also illustrated in FIG. 1, server 110 also includes franchise 117a. Franchise 117a may include one franchise, or multiple franchises. Each of the franchises within franchise 117a may include all the products, items, and content associated with franchise 117a. For example, franchise 117a may include FRANCHISE-1 and all the toys, products, movies, videos, songs, television shows, and other items associated with FRANCHISE-1. Franchise 117a is associated with storyline 116a and each of the items within franchise 117a are used when creating content 118a such that storyline 116a remains consistent across each of the items in franchise 117a.

Content 118a includes videos, television shows, audio such as songs or recordings, comic books, articles, books, or any other information associated with storyline 116a that is created using at least one of writing tool 122a, production tool 124a, post-production tool 126a, and distribution tool 128a. Content 118a may be associated with franchise 117a, or may only be associated with storyline 116a. For example, a user of client device 150 may access server 110 to create or share in the creation of content 118a based on storyline 116a using at least one of writing tool 122a, production tool 124a, post-production tool 126a, and distribution tool 128a.

Client device 150 is configured to aid in the creation of content 118a on server 110 using application 162. In some implementations, client device 150 is configured to access each of writing tool 122a, production tool 124a, post-production tool 126a, and distribution tool 128a across network 130. In other implementations, client device 150 is configured to utilize writing tool 122b, production tool 124b, post-production tool 126b, and distribution tool 128b stored in memory 158 of client device 150. In such an implementation, client device 150 may have previously downloaded each of writing tool 122b, production tool 124b, post-production tool 126b, and distribution tool 128b from server 110, or from another server. Client device 150 may be any computing device, such as a desktop computer, a tablet computer, an optical player, or any device capable of utilizing application 162 to create content 118b.

It should be noted that each of writing tool 122b, production tool 124b, post-production tool 126b, distribution tool 128b, storyline 116b, franchise 117b, and content 118b correspond respectively to writing tool 122a, production tool 124a, post-production tool 126a, distribution tool 128a, storyline 116a, franchise 117a, and content 118a on server 110.

Also illustrated in FIG. 1, client device 150 includes processor 152 and memory 158. Processor 152 may be configured to access memory 158 to store received input or to execute commands, processes, or programs stored in memory 158. Processor 152 may correspond to a processing device, such as a microprocessor or similar hardware processing device, or a plurality of hardware devices. However, in other implementations processor 152 refers to a general processor capable of performing the functions required of client device 150. Memory 158 is capable of storing commands, processes, and programs for execution by processor 152. Memory 158 may be instituted as ROM, RAM, flash memory, or any sufficient memory capable of storing a set of commands. In other implementations, memory 158 may correspond to a plurality memory types or modules.

Also illustrated in FIG. 1, client device 150 includes communication interface 156. Client device 150 may utilize communication interface 156 to communicate with communication interface 114 of server 110 over network 130. Communication interface 156 can utilize any types of wired and wireless interfaces, as examples, one or more of Ethernet, Wireless Fidelity (Wi-Fi), Worldwide Interoperability for Microwave Access (WiMax), ZigBee, Bluetooth, RFID, Algorithm Division Multiple Access (CDMA), Evolution-Data Optimized (EV-DO), Global System for Mobile Communications (GSM), Long Term Evolution (LTE).

Also illustrated in FIG. 1, client device 150 includes input interface 154. Input interface 154 is configured to communicate with input device 172 and display 170. Input interface 154 may communicate with input device 172 and display 170 by a wired and/or a wireless connection. Processor 152 of client device 150 is thus configured to control input interface 154 to communicate with input device 172 and display 170. Input interface 154 can utilize any type of wired and wireless technologies to communicate with input device 172 and display 170.

Also illustrated in FIG. 1, system 100 includes input device 172. Input device 172 may include any devices necessary for interacting with client device 150 and/or display 170. For example, input device 172 may include a keyboard, a microphone, a mouse, a headset, a display, a remote, or any other device. In the present implementation, input device 172 is connected externally to client device 150. However, in some implementations, input device 172 may be built into client device 150, such as if client device 150 is a cellular phone, for example.

Also illustrated in FIG. 1, system 100 includes display 170. Display 170 is configured to display application 162 to a user, including each of writing tool 122b, production tool 124b, post-production tool 126b, and distribution tool 128b as well as content 118b. Display 170 may communicate with client device 150 through input interface 154. Display 170 may comprise a liquid crystal display ("LCD"), a light-emitting diode ("LED"), an organic light-emitting diode ("OLED"), or another suitable display screen that performs a physical transformation of signals to light. In the present implementation, display 170 is connected externally to client device 150. However, in other implementations, display 170 may be built into client device 150 and be configured for touch recognition. In such an implementation, display 170 is at least one of the devices making up input device 172.

Client device 150 also includes application 162. Application 162 is configured to utilize each of writing tool 122b, production tool 124b, post-production tool 126b, and distribution tool 128b to create content 118b. Application 162 may include one application or may include any number of applications. For example, in one implementation, application 162 may include a separate application for each of writing tool 122b, production tool 124b, post-production tool 126b, and distribution tool 128b. However, in other implementations, application 162 may include one application that controls each of writing tool 122*b*, production tool 124*b*, post-production tool 126*b*, and distribution tool 128*b*. In one implementation, after content 118*b* is distributed, a viewer may provide direct inputs back into system 100 or viewer metrics may be captured by system 100 for further use by content providers for modification and creation of contents.

Figure 2:
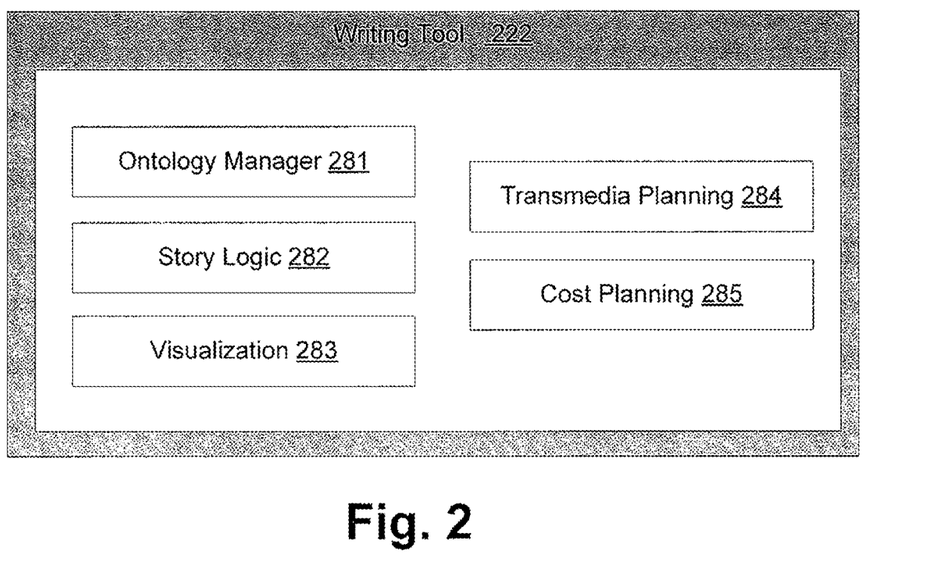
FIG. 2 presents a writing tool of a system for non-linear content creation, according to one implementation of the present disclosure.

Now referring to FIG. 2, FIG. 2 presents a writing tool of a system for non-linear content creation, according to one implementation of the present disclosure. FIG. 2 includes writing tool 222. Writing tool 222 includes ontology manager 281, story logic 282, visualization 283, transmedia planning 284, and cost planning 285. It should be noted that writing tool 222 corresponds to writing tool 122*a* and writing tool 122*b* of FIG. 1.

Ontology manager 281 is configured to maintain relationships between character worlds, vocabularies, characters, objects, places, actions, and events in the storyline. Ontology manager 281 may be output in graphical form, such as the graph shown in FIG. 6, which will be described in more detail below. For example, ontology manager 281 updates character relationships within the storyline as the storyline progresses. If CHARACTER-1 becomes an enemy of CHARACTER-2 at some point in the storyline, ontology manager updates and maintains the state of the relationship between CHARACTER-1 and CHARACTER-2 to create continuity in the storyline. As such, when the user writes a scene for the content, such as content 118*a* of FIG. 1, ontology manager 281 provides the user with information relating to the current relationship between CHARACTER-1 and CHARACTER-2. The same process is completed by ontology manager 281 for vocabularies, characters worlds, objects, places, actions, and events in the storyline.

In addition, ontology manager 281 is configured to update character development and/or character status. For example, if CHARACTER-1 dies in a television show episode, and the user creating the content tries to include CHARACTER-1 in the content, ontology manager 281 provides a warning to the user that CHARACTER-1 can only appear as a ghost, or in a flashback, in order to maintain continuity with the storyline.

Ontology manager 281 may include classes of concepts, e.g. Characters, Titles, Episodes, etc. Ontology manager 281 may also include controlled vocabulary lists. For example, in the love subclass of the keywords class, the controlled vocabulary may contain kiss, love, sex, marriage, etc. Ontology manager 281 may further include authority lists, e.g. Iron Man 3, not Iron Man Three, and may also include ontological relationships and rules, e.g. Episode 'hasCharacter' Protagonist, where 'hasCharacter' defines a relationship between classes.

Story logic 282 is configured to interact with ontology manager 281 and to store logical elements in the storyline to manage inconsistencies, help provide simplicity, and make recommendations. For example, during use of writing tool 222, story logic 282 may provide information to the user dynamically during creation of the content if the user creates an event that is inconsistent with the storyline. In addition, during creation of the content by the user, story logic 282 may provide more simplified event ideas or recommend events for including in the content based on the storyline, historical information, costs, and other relevant information.

Visualization 283 is configured to output information from story logic 282 and ontology manager 281 onto a visualization graph and receive inputs based on manipulation of the visualization graph. For example, the user may manipulate the visualization graph using visualization 283, where the visualization graph includes events, characters, locations, and other information from story logic 282 and ontology manager 281, to create or alter events in the storyline. Visualization 283 provides a visual tool for viewing the storyline through time and space in order to create continuity and avoid inconsistencies in the storyline.

Also illustrated in FIG. 2, writing tool 222 also includes transmedia planning 284. Transmedia planning 284 is configured to enable the user, who may be a script writer, for example, to insert transmedia elements or functions into the scriptwriting process. In addition, transmedia planning 284 is configured to receive inputs from numerous platforms and create business rules and logic for dealing with the inputs. For example, transmedia planning 284 may be configured to plan for conversion of a book to a movie, or a comic book to a video game.

Turning to cost planning 285, cost planning 285 is configured to utilize business rules and assumptions, during creation of the content, to render in real time projected costs for a scene or a shot list for what would be required to capture a scene. For example, if the user is writing a script for a movie, cost planning 285 would utilize business rules and assumptions based on historical information to provide real time costs for creating the scene in the movie. In such an example, if the user is writing a fighting scene into the script which would require several explosions, cost planning 285 may provide historical information on the price of shooting similar scenes and also provide budget information for the current content. As such, cost planning 285 provides the user with real time information during creation of the content to help the user create a script for a movie that fits within a specified budget so that the content requires fewer alterations during creation of the movie.

Figure 3:
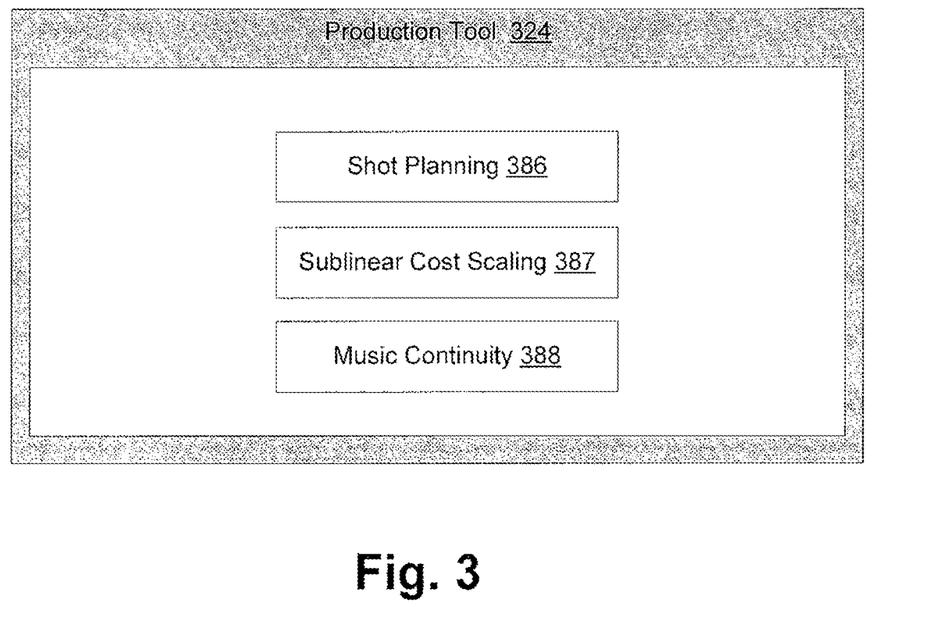
FIG. 3 presents a production tool of a system for non-linear content creation, according to one implementation of the present disclosure.

FIG. 3 presents a production tool of a system for non-linear content creation, according to one implementation of the present disclosure. FIG. 3 includes production tool 324. Production tool 324 includes shot planning 386, sublinear cost scaling 387, and music continuity 388. It should be noted that production tool 324 corresponds to production tool 124*a* and production tool 124*b* of FIG. 1.

Shot planning 386 is configured to utilize logic from the writing tool, such as writing tool 222, to provide detailed shot planning for the production of non-linear or transmedia productions. Shot planning 386 provides detailed shot planning output as a shot list to an industry standard.

Sublinear cost scaling 387 is configured to utilize algorithms based on user inputs and business logic to optimize cost below linear scaling. For example, sublinear cost planning 387 may be configured to identify shots or scenes that can be used multiple times in multiple scenes such that the costs scale sublinearly with the non-linear growth of the story.

Music continuity 388 is configured to build intelligence into the content in order to provide continuous music for a consistent experience even in non-linear interactive stories. For example, if a story requires user inputs to determine the direction of the story which creates jumps between scenes and/or skipped scenes, music continuity 388 provides consistent and continuous music to plan for the multiple paths and/or outcomes.

Figure 4:
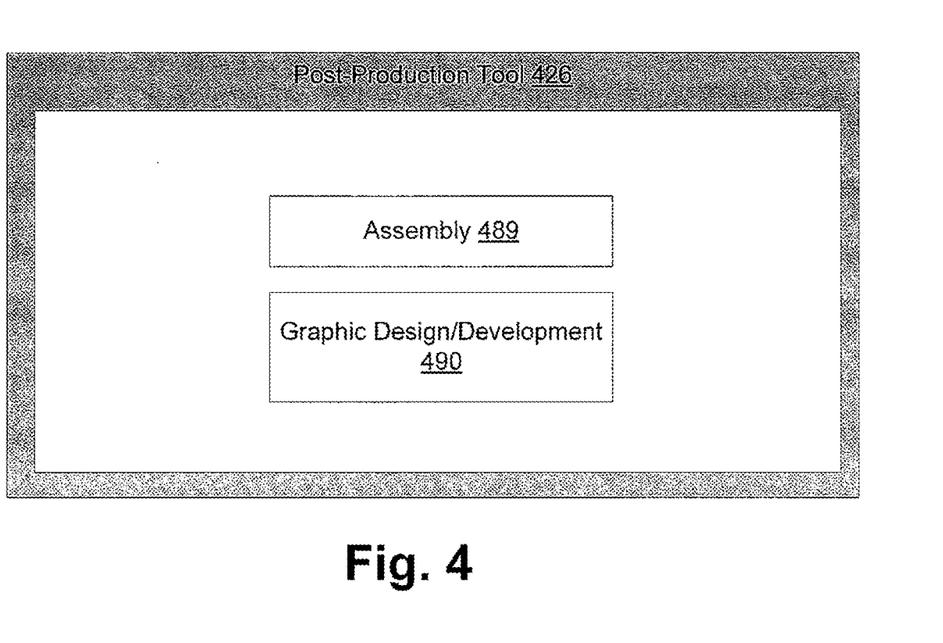
FIG. 4 presents a post-production tool of a system for non-linear content creation, according to one implementation of the present disclosure.

FIG. 4 presents another a post-production tool of a system for non-linear content creation, according to one implementation of the present disclosure. FIG. 4 includes post-production tool 426. Post-production tool 426 includes assembly 489 and graphic design/development 490. It should be noted that post-production tool 426 corresponds to post-production tool 126a and post-production tool 126b of FIG. 1.

Figure 5:
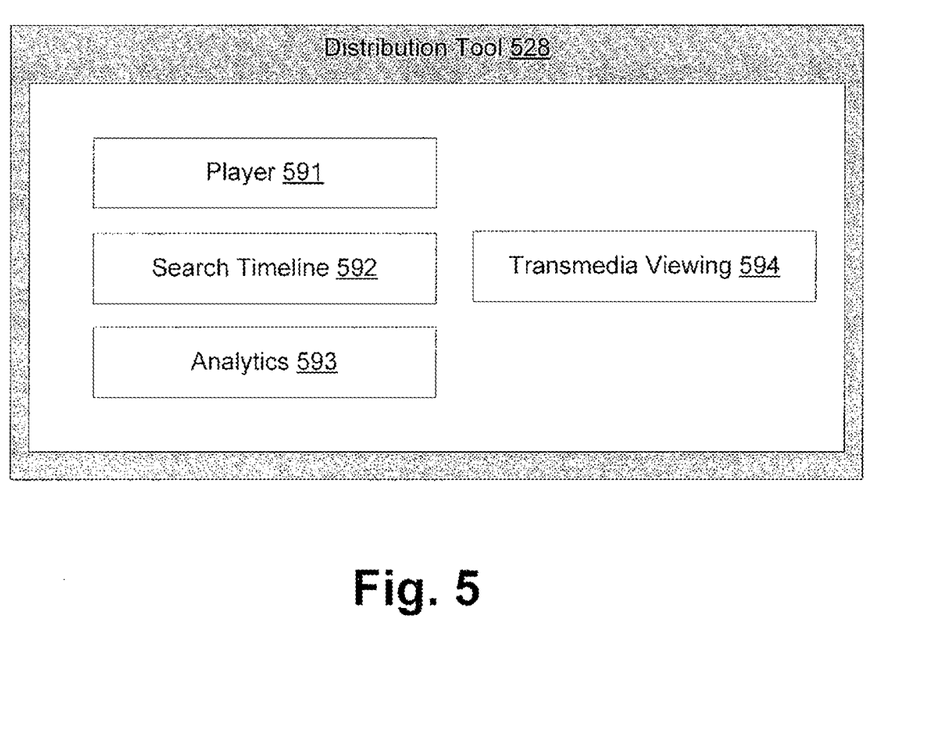
FIG. 5 presents a distribution tool of a system for non-linear content creation, according to one implementation of the present disclosure.

Assembly 489 is configured to provide an interface that is pre-loaded with logic written into the script by the writing tool, the production tool, and the distribution tool, such as writing tool 222 of FIG. 2, production tool 324 of FIG. 3, and distribution tool 528 of FIG. 5. Assembly 489 utilizes the logic to label viewer choice including logic and limits accompanying viewer choice. The interface included within assembly 489 is similar to a non-linear editor and is configured to receive inputs from the user/writer and the producer, where the inputs are persisted back to the original content, such as the script, with all the changes made by the inputs logged and tracked.

Also illustrated in FIG. 4, post-production tool 426 includes graphic design/development 490. Graphic design/development 490 is configured to predict and provide graphic needs and development needs for the post-production aspects of the content. For example, if transmedia elements or website designs associated with the content are determined to be necessary based off of logic in graphic design/development 490, then graphic design/development 490 provides planning to link the associated information to assembly 489.

FIG. 5 presents a distribution tool of a system for non-linear content creation, according to one implementation of the present disclosure. FIG. 5 includes distribution tool 528. Distribution tool 528 includes player 591, search timeline 592, analytics 593, and transmedia viewing 594. It should be noted that distribution tool 528 corresponds to distribution tool 128a and distribution tool 128b of FIG. 1.

Player 591 is configured to utilize the assembly and graphic design/development, such as assembly 489 and graphic design/development 490 of FIG. 4, to generate an output using a codec that is compatible with a media device, such as a digital video player. The media device must be configured to read the logic and feature set written into the content, such as the script, after the content has been produced and assembled by the production tool and post-production tool, such as production tool 324 of FIG. 3 and post-production tool 426 of FIG. 4.

Search timeline 592 is configured to provide a timeline or overview of all the events and logic in the storyline of the content to enable the viewer of the content to navigate non-linearly through the storyline in a graphical way. As such, the viewer is able to reach or retrieve previous events, revisit storylines that were skipped over in the past, or to select a new or different path through the content. Search timeline 592 may be implemented to the specifications created by the user of the client device, such as client device 150 of FIG. 1.

Analytics 593 is configured to request, receive, and store analytics and information about viewer engagement with the content as well as any previous content associated with the storyline. In response to receiving and storing the viewer engagement feedback, analytics 593 includes the information and analytics in the visualization graph, such as that included in visualization 283 of FIG. 2. As such, the user of the writing tool, such as writing tool 222 of FIG. 2, has the information and analytics available to them as they create the content, which allows the user to adjust the content based on viewer and/or user engagement levels.

Viewer engagement feedback may be requested by analytics 593 in question form, may be based on engagement or usage of certain scenes and/or content, or based on other viewer engagement information. Analytics 593 may include pre-defined metrics or business logic that are used to trigger positive or negative feedback levels, such as a certain number of user who re-watch a particular scene, or a certain number of viewers who answer a question a certain way. For example, if positive feedback is received by analytics 593 during a certain scene including CHARACTER-1 and CHARACTER-2, the user of the writing tool, such as writing tool 222 of FIG. 2, may include additional scenes in the content including both CHARACTER-1 and CHARACTER-2, such as content 118a of FIG. 1. In another example, if a majority of viewers respond to a question about their favorite scene being SCENE-1 within a prior content, then the user may include additional scenes similar to SCENE-1 in the content, such as content 118a of FIG. 1.

In one implementation, analytics 593 may include a menu to describe Key Performance Indicators ("KPI). Analytics 593 may be associated with intended actions, which are desired or anticipated by creators. For example, one KPI may relate to viewer durations, while another KPI may be related to Twitter volume tied to a hashtag. For each storyline or distribution channel, the menu may be used for selecting one or more KPIs, add, define and/or edit KPIs.

Transmedia viewing 594 is configured to enable open application program interface (API) integration with other media platforms that are associated with or have a place in the transmedia storytelling experience of the storyline. In addition, transmedia viewing 594 enables multiple and simultaneous viewing modes and enables the logic written into the content, such as the script, to control the perspective or view of the viewer based on predefined criteria. For example, it may be determined by transmedia viewing 594 that a certain location on a theme ride attracts the attention of the theme ride users, and thus transmedia viewing 594 presents the content on a display in the location that attracts the attention of the theme ride users.

Figure 6:
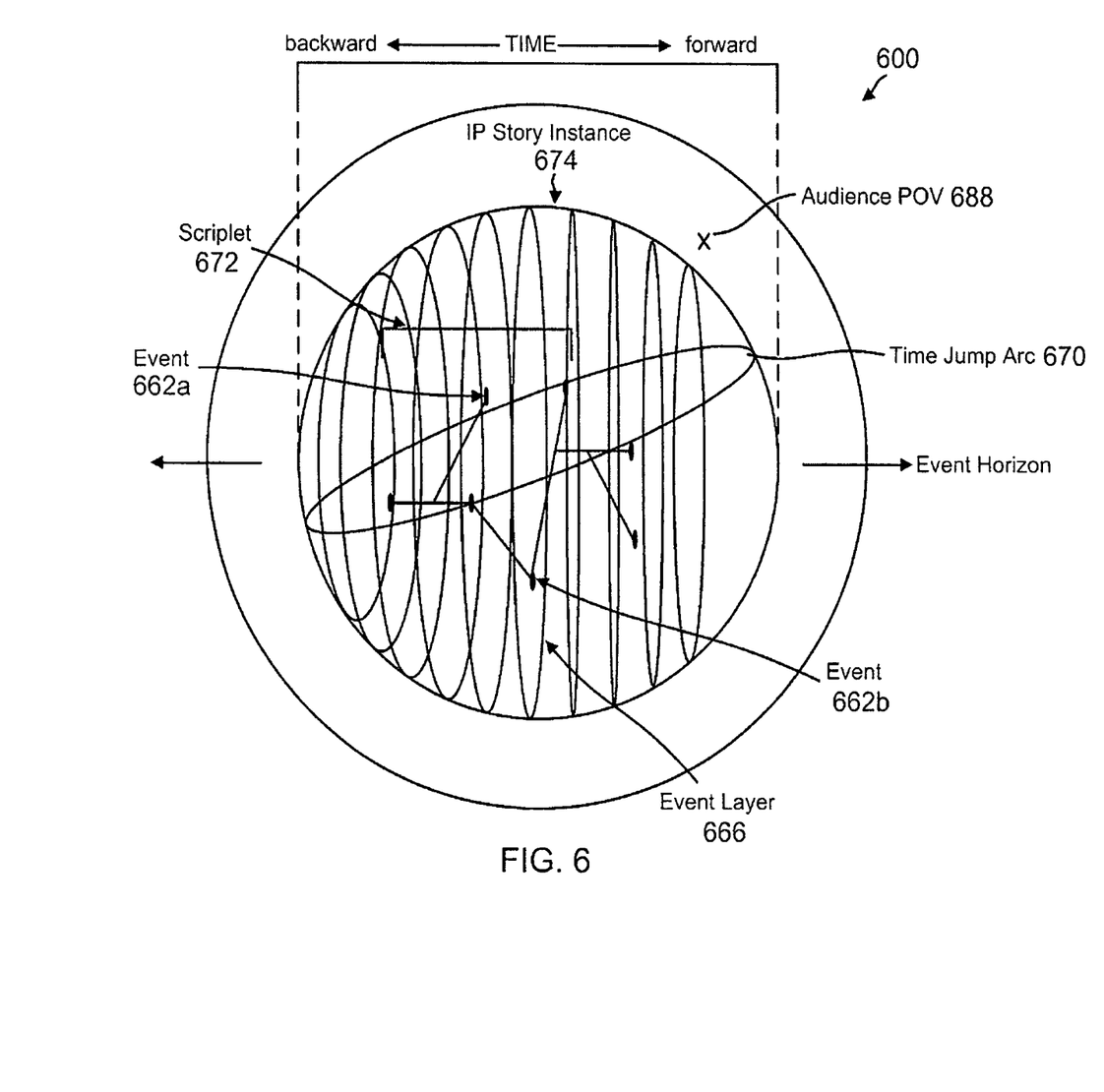
FIG. 6 presents a diagram of logic of a storyline, according to one implementation of the present disclosure.

FIG. 6 presents a diagram of logic of a storyline, according to one implementation of the present disclosure. Diagram 600 of FIG. 6 includes event 662a, event 662b, scriplet 672, IP story instance 674, Audience POV (point of view) 668, time jump arc 670, and event layer 666. Diagram 600 illustrates a map of the storyline logic for visualization by a user of a client device, such as client device 150 of FIG. 1, during creation of the content, such as content 118b of FIG. 1. Diagram 600 provides a visual source for the user when determining which events or actions should be included in the content, and also to determine how the events should be presented to the audience. Each of a writing tool, a production tool, a post-production tool, and a distribution tool, such as writing tool 122a, production tool 124a, post-production tool 126a, and distribution tool 128a of FIG. 1, respectively, add to and utilize diagram 600.

IP story instance 674 includes the instance of the storyline within the IP universe. For example, IP story instance 674 presents actions, events, effects, POV variables, character logic, and historical information of the story in the IP universe for visualization by the user. IP story instance 674 includes events and actions over history of time within the storyline.

Event layer 666 includes a layer within IP story instance 674 that is affected by an event, such as event 662a and/or event 662b. IP story instance 674 is made up of a plurality of event layers 666. Event layer 666 visually displays the effect across time and across the event horizon of how an event impacts the IP story instance 674 and ultimately the IP universe. Each of event 662a and event 662b may include actions, events, effects, POV variables, and/or character logic rules. Each of event 662a and event 662b includes a scene within the storyline.

Scriplet 672 is a story arc with a beginning, middle, and end. Scriplet 672 may be a television show, a movie, or other storyline experience. Scriplet 672, as displayed in diagram 600, may cross linear or non-linear time. For example, scriplet 672 may progress chronologically in time or may jump around in time, such as a movie that includes flashbacks or scenes that happen in the future.

Audience POV 668 is the point of view of the audience, and is similar to an astrological star chart, and it is the point from which the viewers of the content see the storyline unfold. The audience POV 668 determines what is known and not known to the audience from their point of view with respect to diagram 600. The audience POV 668 allows the user who creates the content to know exactly what the viewers already know and what they do not know, so that the user can continue to hide parts of the storyline from the viewers. However, although the viewers cannot see certain events and/or actions in the storyline, the user who creates the content can use diagram 600 to track the storyline in logical order.

Time jump arc 670 includes the visualization of flashbacks, flash forwards, time travel, and similar events in a storyline. Time jump arc 670 allows the user who creates the content to understand the order of events in the storyline, and the periods in time in which the events occur. As a result, the user can create the content consistent with the storyline.

Figure 7:
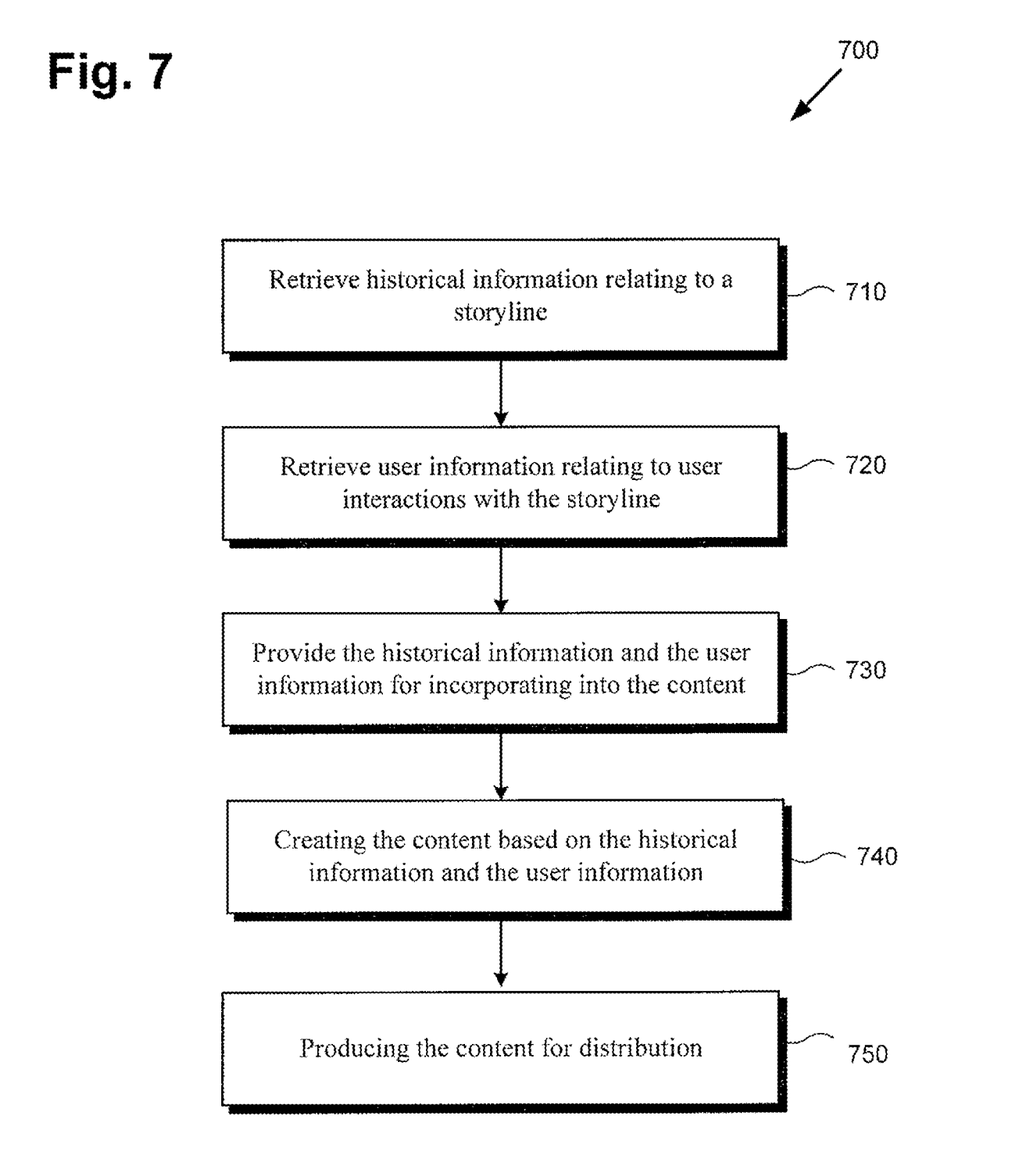
FIG. 7 shows a flowchart illustrating a method for non-linear content creation, according to one implementation of the present disclosure.

FIG. 7 shows a flowchart illustrating a method for non-linear content creation, according to one implementation of the present disclosure. The approach and technique indicated by flowchart 700 are sufficient to describe at least one implementation of the present disclosure, however, other implementations of the disclosure may utilize approaches and techniques different from those shown in flowchart 700. Furthermore, while flowchart 700 is described with respect to FIG. 1, the disclosed concepts are not intended to be limited by specific features shown and described with respect to FIG. 1.

Referring now to flowchart 700 of FIG. 7, flowchart 700 (at 710) includes retrieving historical information relating to a storyline. For example, server 110 retrieves historical information relating to storyline 116a, franchise 117a, and other information generated by writing tool 122a, production tool 124a, post-production tool 126a, and distribution tool 128a. The information may include logic, analytics, timelines, and other information necessary for server 110 and/or client device 150 to generate content 118a and/or content 118b, respectively.

Referring to flowchart 700 of FIG. 7, flowchart 700 (at 720) includes retrieving user information relating to user interactions with the storyline. For example, server 110 retrieves user information from distribution tool 128a relating to viewer feedback or viewer engagement levels. The user information is then utilized by server 110 to assist the user of client device 150 to create content 118b consistent with the user information.

Next, flowchart 700 (at 730) includes providing the historical information and the user information for incorporating into the content. For example, the information associated with and generated from storyline 116a, franchise 117a, writing tool 122a, production tool 124a, post-production tool 126a, and distribution tool 128a are provided to server 110 and/or client device 150 for incorporation into content 118a and content 118b. Incorporation into content 118a and content 118b includes both actual incorporation of the information into content 118a and content 118b as well as utilizing the information to create content 118a and content 118b. For example, historical information such as an event relating to storyline 116a may be incorporated into content 118a in addition to another event that is incorporated based on viewer engagement levels for a certain type of scene, such as a scene that includes both CHARACTER-1 and CHARACTER-2.

Flowchart 700 (at 740) includes creating the content using the historical information and the user information. For example, user of client device 150 creates content 118a and/or content 118b using the information associated with and generated from storyline 116a, franchise 117a, writing tool 122a, production tool 124a, post-production tool 126a, and distribution tool 128a. For example, a movie, a television show, or another type of content is created using all of the information from historical storyline information to information gathered after distribution of other content to viewers. As such, the information gathered at each level of creation and distribution of content is utilized in creating non-linear content across numerous platforms. Flowchart 700 (at 750) includes producing and distributing the content created at 740. For example, server 110 and/or client device 150 may encode an audiovisual content created at 740, and distribute the encoded audiovisual content.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for creation of a content, the system comprising:
   a memory configured to store a distribution tool configured to generate a key performance indicators (KPI) menu including analytics associated with a storyline; and
   a processor configured to:
      retrieve historical information relating to the storyline;
      retrieve user information relating to user interactions with the storyline;
      provide the historical information and the user information for incorporating into the content;
      generate the content using the historical information and the user information;
      output a visualization graph on a display to a creator of the content, the visualization graph including events, characters, locations and the historical information of the storyline, wherein the visualization graph includes an event layer visually displaying an effect of at least one of the events on the storyline across time, wherein the visualization graph includes the KPI menu having the analytics associated with the storyline;
      receive a manipulation of the visualization graph from the creator informed by the analytics associated with the storyline to alter the events in the storyline;

provide a warning to the creator on the display when the altering of the events in the storyline causes an inconsistency in the storyline; and alter the events in the storyline when the altering of the events in the storyline does not cause any inconsistency in the storyline.

2. The system of claim 1, wherein the distribution tool is further configured to enable an application program interface (API) integration with an external media platform.

3. The system of claim 1, wherein the historical information includes relationships involving at least one of the characters, character worlds, vocabularies, objects, the locations, actions, or the events in the storyline.

4. The system of claim 1, wherein the visualization graph includes a time jump arc having a visualization of a flashback event, a flash forward event, or a time jump event.

5. The system of claim 1, wherein the user information includes at least one of user viewing histories, user engagement levels, or user feedback.

6. The system of claim 1, wherein the providing the historical information and the user information for incorporating into the content includes:
providing notification of inconsistencies for continuity with the storyline; and
providing recommendations based on business rules, production history, and the user information for cost scaling.

7. The system of claim 1, wherein the providing the historical information and the user information for incorporating into the content includes providing an interface that is pre-loaded with logic based on the historical information and the user information.

8. The system of claim 1, wherein the providing the historical information and the user information for incorporating into the content includes providing a timeline of the events and logic in the storyline based on the historical information and the user information.

9. The system of claim 1, wherein the generating the content using the historical information and the user information includes tailoring the content based on the historical information and the user information to create continuity with the storyline and cost management.

10. The system of claim 1, wherein generating the content using the historical information and the user information includes building intelligence into the content for musical continuity through multiple paths and outcomes in the content.

11. The system of claim 1, wherein the visualization graph includes a projected cost for at least one scene of the events.

12. The system of claim 1, wherein the memory is further configured to store a writing tool, a production tool, and a post-production tool,
wherein the writing tool is configured to maintain the historical information including relationships involving at least one of the characters, character worlds, vocabularies, objects, the locations, actions, or the events in the storyline,
wherein the production tool is configured to output a shot list for the content;
wherein the post-production tool is configured to assemble or edit the content; and
wherein the distribution tool is configured to collect the user information including at least one of user viewing histories, user engagement levels, or user feedback.

13. A method for creation of a content using a distribution tool to generate a key performance indicators (KPI) menu including analytics associated with a storyline, the method comprising:
retrieving historical information relating to the storyline;
retrieving user information relating to user interactions with the storyline;
providing the historical information and the user information for incorporating into the content;
generating the content using the historical information and the user information;
outputting a visualization graph on a display to a creator of the content, the visualization graph including events, characters, locations and the historical information of the storyline, wherein the visualization graph includes an event layer visually displaying an effect of at least one of the events on the storyline across time, wherein the visualization graph includes the KPI menu having the analytics associated with the storyline;
receiving a manipulation of the visualization graph from the creator informed by the analytics associated with the storyline to alter the events in the storyline;
providing a warning to the creator on the display when the altering of the events in the storyline causes an inconsistency in the storyline; and
altering the events in the storyline when the altering of the events in the storyline does not cause any inconsistency in the storyline.

14. The method of claim 13, further comprising:
enabling, using the distribution tool, an application program interface (API) integration with an external media platform.

15. The method of claim 13, wherein the historical information includes relationships involving at least one of the characters, character worlds, vocabularies, objects, the locations, actions, or the events in the storyline.

16. The method of claim 13, wherein the visualization graph includes a time jump arc having a visualization of a flashback event, a flash forward event, or a time jump event.

17. The method of claim 13, wherein the user information includes at least one of user viewing histories, user engagement levels, or user feedback.

18. The method of claim 13, wherein the providing the historical information and the user information for incorporating into the content includes:
providing notification of inconsistencies for continuity with the storyline; and
providing recommendations based on business rules, production history, and the user information for cost scaling.

19. The method of claim 13, wherein the providing the historical information and the user information for incorporating into the content includes providing an interface that is pre-loaded with logic based on the historical information and the user information.

20. The method of claim 13, wherein the providing the historical information and the user information for incorporating into the content includes providing a timeline of the events and logic in the storyline based on the historical information and the user information.

21. The method of claim 13, wherein the generating the content using the historical information and the user information includes tailoring the content based on the historical information and the user information to create continuity with the storyline and cost management.

22. The method of claim 13, wherein generating the content using the historical information and the user information includes building intelligence into the content for musical continuity through multiple paths and outcomes in the content.

23. The method of claim 13, wherein the visualization graph includes a projected cost for at least one scene of the events.

24. The method of claim 13, wherein the method further uses a writing tool, a production tool, and a post-production tool for creation of the content, the method further comprising:
maintaining, using the writing tool, the historical information including relationships involving at least one of the characters, character worlds, vocabularies, objects, the locations, actions, and the events in the storyline,
outputting, using the production tool, a shot list for the content;
assembling or editing, using the post-production tool, the content; and
collecting, using the distribution tool, the user information including at least one of user viewing histories, user engagement levels, or user feedback.

25. A system for creation of a content, the system comprising:
a memory configured to store a distribution tool, wherein the distribution tool is configured to generate a key performance indicators (KPI) menu including analytics associated with a storyline; and
a processor configured to:
retrieve historical information relating to the storyline;
retrieve user information relating to user interactions with the storyline;
provide the historical information and the user information for incorporating into the content;
generate the content using the historical information and the user information;
output a visualization graph on a display to a creator of the content, the visualization graph including events, characters, locations and the historical information of the storyline, wherein the visualization graph includes an event layer visually displaying an effect of at least one of the events on the storyline across time, wherein the visualization graph includes the KPI menu having the analytics associated with the storyline;
receive a manipulation of the visualization graph from the creator informed by the analytics associated with the storyline to alter the events in the storyline; and
provide a warning to the creator on the display when the altering of the events in the storyline causes an inconsistency in the storyline.

* * * * *